UNITED STATES PATENT OFFICE.

HUGO GELDERMANN AND FELIX MEYER, OF DESSAU, ANHALT, GERMANY, ASSIGNORS TO ACTIEN GESELLSCHAFT FÜR ANILIN FABRIKATION, OF BERLIN, GERMANY.

AZO DYE.

1,411,245. Specification of Letters Patent. Patented Mar. 28, 1922.

No Drawing. Application filed August 15, 1921. Serial No. 492,491.

*To all whom it may concern:*

Be it known that we, HUGO GELDERMANN and FELIX MEYER, citizens of the Republic of Germany, residing at Dessau, in Anhalt, Germany, have invented certain new and useful Improvements in Azo Dyes, (for which I have made application in Germany July 31, 1915; Austria March 2, 1916; England June 15, 1920; France June 17, 1920, and in Switzerland June 21, 1920,) of which the following is a specification.

Our invention relates to new azo-dyes deriving from a non-sulfonated substitution derivative of diazotized 2-aminophenol and 1.2'-carboxybenzoylamino-7-oxynaphthalene obtainable by heating molecular proportions of 1-amino-7-oxynaphthalene with phthalic anhydride in low-boiling indifferent solvents such as benzene. They correspond to the general formula

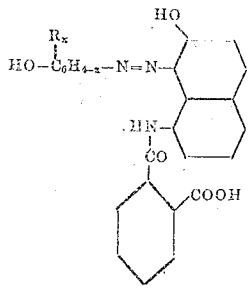

R meaning one or two substituents such as a halogen atom or the nitro group or an alkyl group.

These new dyes when dyed in the presence of an alkali-metal chromate and an ammonium salt such as ammonium sulfate furnish on wool olive tints of an excellent fastness to milling.

The dyes in the shape of their dry pulverized sodium salts are dark powders soluble in water with a violet color and soluble in concentrated sulfuric acid to bluish red solutions from which on addition of ice the dye is precipitated in the form of reddish flocks. By strong reducing agents they are destroyed yielding a 2-aminophenol substituted in the nucleo and 1.2'-carboxybenzoylamino-8-amino-7-oxynaphthalene.

In order to illustrate how the new dyes may be manufactured, without limiting the invention, the following example is given the parts being by weight:

Example: 15.4 parts of 4-nitro-2-aminophenol are diazotized in known manner by means of hydrochloric acid and sodium nitrite. Then the diazo compound is added to a solution of 31 parts of 1.2'-carboxybenzoylamino-7-oxynaphthalene maintained alkaline by sodium carbonate. When the combination is complete the dye is salted out, drained and dried. Its constitution in the free state is expressed by the formula

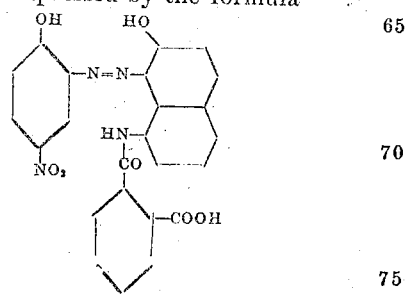

Its reduction products are 2.4-diaminophenol and 1.2'-carboxybenzoylamino-8-amino-7-oxynaphthalene.

Similar dyes are produced if the 4-nitro-2-aminophenol is replaced in the equivalent proportions by another 2-aminophenol derivative for instance by 4-chloro-, 4.6-dichloro-, 4.6-dinitro-, 5-nitro-4-methyl-, 5-nitro-4-chloro-, 4-nitro-6-chloro, 6-nitro-4-chloro-2-amino-1-oxybenzene.

Having now described our invention and in what manner it may be performed what we claim is,—

1. The new azo dyes in the free state correspond to the general formula

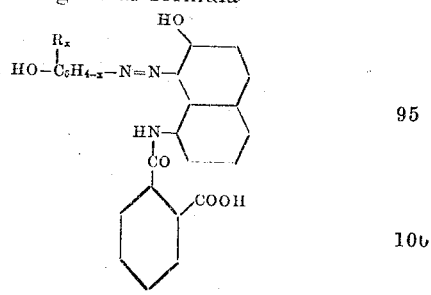

where R is a univalent radical exclusive of the sulfo group; in the shape of their pulverized dry sodium salts being dark powders soluble in water with a violet color and soluble in concentrated sulfuric acid to bluish red solutions from which on addition of ice the dyes are precipitated in the form of reddish flocks; being destroyed by strong reducing agents yielding a 2-aminophenol substituted in the nucleo and 1.2'-carboxybenzoylamino- 8-amino-7-oxynaphthalene; dyeing wool olive in the presence of an alkali-metal chromate and an ammonium salt.

2. The new azo dye in the free state corresponding to the formula

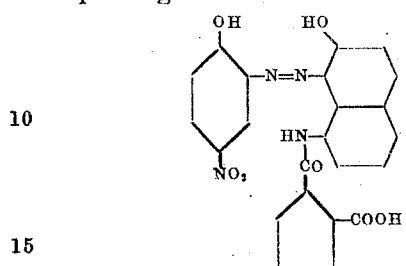

in the shape of its pulverized dry sodium salt being a dark powder soluble in water with a violet color and soluble in concentrated sulfuric acid to a bluish red solution from which on addition of ice the dye is precipitated in the form of reddish flocks; being destroyed by strong reducing agents yielding 2.4-diaminophenol and 1.2'-carboxybenzoylamino-8-amino-7-oxynaphthalene; dyeing wool olive in the presence of an alkali-metal chromate and an ammonium salt.

In testimony whereof we affix our signatures in presence of two witnesses.

HUGO GELDERMANN.
FELIX MEYER.

Witnesses:
CARL DOHUYER,
ALFRED W. DONEYUER.